United States Patent
Tan et al.

(10) Patent No.: US 8,130,198 B2
(45) Date of Patent: Mar. 6, 2012

(54) ELECTRONIC DEVICE AND METHOD FOR OPERATING APPLICATION PROGRAMS IN THE SAME

(75) Inventors: Yun Long Tan, Taoyuan (TW); Yien Chun Kuo, Taoyuan (TW)

(73) Assignee: HTC Corporation, Taoyuan City (TW)

( * ) Notice: Subject to any disclaimer, the term of this patent is extended or adjusted under 35 U.S.C. 154(b) by 681 days.

(21) Appl. No.: 12/346,335

(22) Filed: Dec. 30, 2008

(65) Prior Publication Data
US 2009/0167692 A1    Jul. 2, 2009

(30) Foreign Application Priority Data

Dec. 31, 2007  (TW) .............................. 96151361 A (51) Int. Cl.
*G06F 3/02*  (2006.01)
(52) U.S. Cl. ...................................... 345/168
(58) Field of Classification Search .................. None
See application file for complete search history.

(56) References Cited

U.S. PATENT DOCUMENTS

| | | | | |
|---|---|---|---|---|
| 5,785,439 | A * | 7/1998 | Bowen | 400/472 |
| 6,525,717 | B1 * | 2/2003 | Tang | 345/177 |
| 7,750,891 | B2 | 7/2010 | Stephanick et al. | |
| 2002/0075239 | A1 * | 6/2002 | Potkonen | 345/168 |
| 2003/0052863 | A1 * | 3/2003 | Hsia | 345/168 |
| 2004/0196270 | A1 | 10/2004 | Chiu et al. | |
| 2004/0212598 | A1 * | 10/2004 | Kraus et al. | 345/168 |
| 2005/0093826 | A1 * | 5/2005 | Huh | 345/168 |
| 2005/0122316 | A1 | 6/2005 | Hsiang | |
| 2005/0264521 | A1 | 12/2005 | Liu et al. | |
| 2007/0279385 | A1 | 12/2007 | Woolley et al. | |
| 2008/0211775 | A1 * | 9/2008 | Hotelling et al. | 345/168 |
| 2009/0167692 | A1 * | 7/2009 | Tan et al. | 345/168 |
| 2009/0195506 | A1 * | 8/2009 | Geidl et al. | 345/168 |
| 2009/0231281 | A1 * | 9/2009 | Whytock et al. | 345/168 |

FOREIGN PATENT DOCUMENTS

| | | |
|---|---|---|
| TW | M240050 | 8/2004 |
| TW | I254885 | 5/2006 |
| TW | 200715171 | 4/2007 |
| TW | I290690 | 12/2007 |

* cited by examiner

*Primary Examiner* — Peter Vincent Agustin
(74) *Attorney, Agent, or Firm* — Lowe, Hauptman, Ham & Berner, LLP (57) ABSTRACT

The present invention provides a method for operating application programs in an electronic device, which has a keyboard unit, a touch sensing element and a display. First, the border information corresponding to a border area of the user interface provided by an application program is transmitted to a driving unit of the keyboard unit. Afterward, the keyboard unit is divided into at least two sensing areas corresponding to the operation areas of the user interface according to the border information. Next, the touch sensing element detects a touch on one of the sensing areas on the keyboard unit and then generates a responsive signal according to the touch. Finally, an action is performed on the corresponding operation area of the user interface according to the responsive signal.

12 Claims, 9 Drawing Sheets

ELECTRONIC DEVICE AND METHOD FOR OPERATING APPLICATION PROGRAMS IN THE SAME

CROSS REFERENCE TO RELATED APPLICATION

This application claims the priority benefit of Taiwan Patent Application Serial Number 096151361 filed Dec. 31, 2007, the full disclosure of which is incorporated herein by reference.

BACKGROUND OF THE INVENTION

1. Field of the Invention

The invention relates to a method for operating application programs in an electronic device, and more particularly, to a method for operating application programs in an electronic device through a touch keyboard.

2. Description of the Related Art

Figure 1:
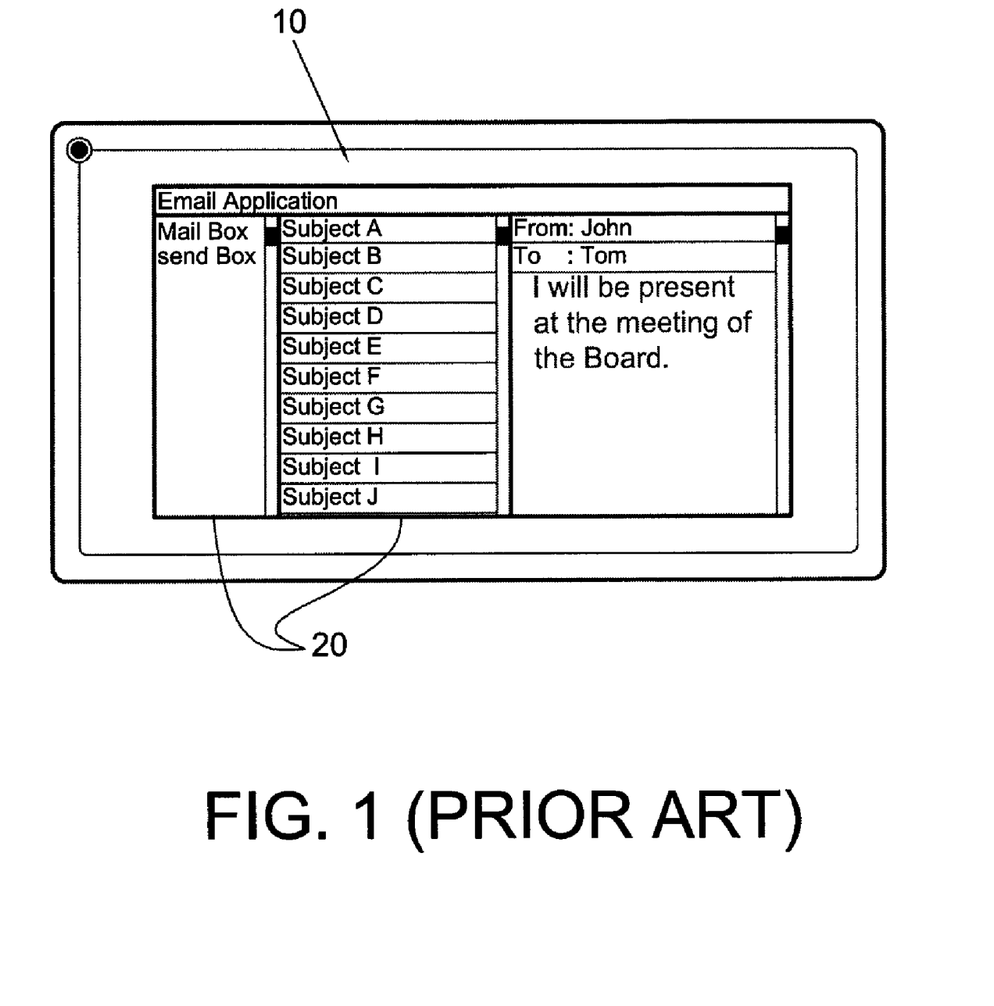
FIG. 1 illustrates the user interface of a conventional application program.

Referring to FIG. 1, several commercially available computer programs or application programs at present, including Outlook and PowerPoint applications developed by Microsoft Corporation, have their respective user interfaces 10 comprised of a plurality of operation areas 20. The operation areas 20 can show some information for users. However, a user is always required to use a pointing device, e.g. mouse, to constantly move the cursor back and forth between the operation areas 20 or to scroll/pan the operation areas 20 in order to completely browse all the information shown thereon. Generally, these actions are very time-consuming and inconvenient for users.

SUMMARY OF THE INVENTION

It is an object of the present invention to provide a method for operating application programs in an electronic device, wherein an action is performed by touching with a touch keyboard unit on the operation area of the application program.

In order to achieve the above object, the method for operating application programs in an electronic device according to the present invention is first to launch an application program. Afterward, the border information of the border areas of the user interface of the application program is acquired and transmitted to the driving unit of a keyboard unit. According to the border information, the driving unit divides the keyboard unit into at least two sensing areas respectively corresponding to the operation areas of the user interface. A user touches one of the sensing areas of the keyboard unit with his finger to perform a corresponding action on the operation area of the user interface corresponding to the touched sensing area.

According to the method for operating application programs in an electronic device, a user is not required to use a pointing device to move the cursor on a display back and forth between the operation areas in order to completely browse all the information shown thereon. All the information can be browsed by just moving the user's finger over the keyboard unit.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 2:
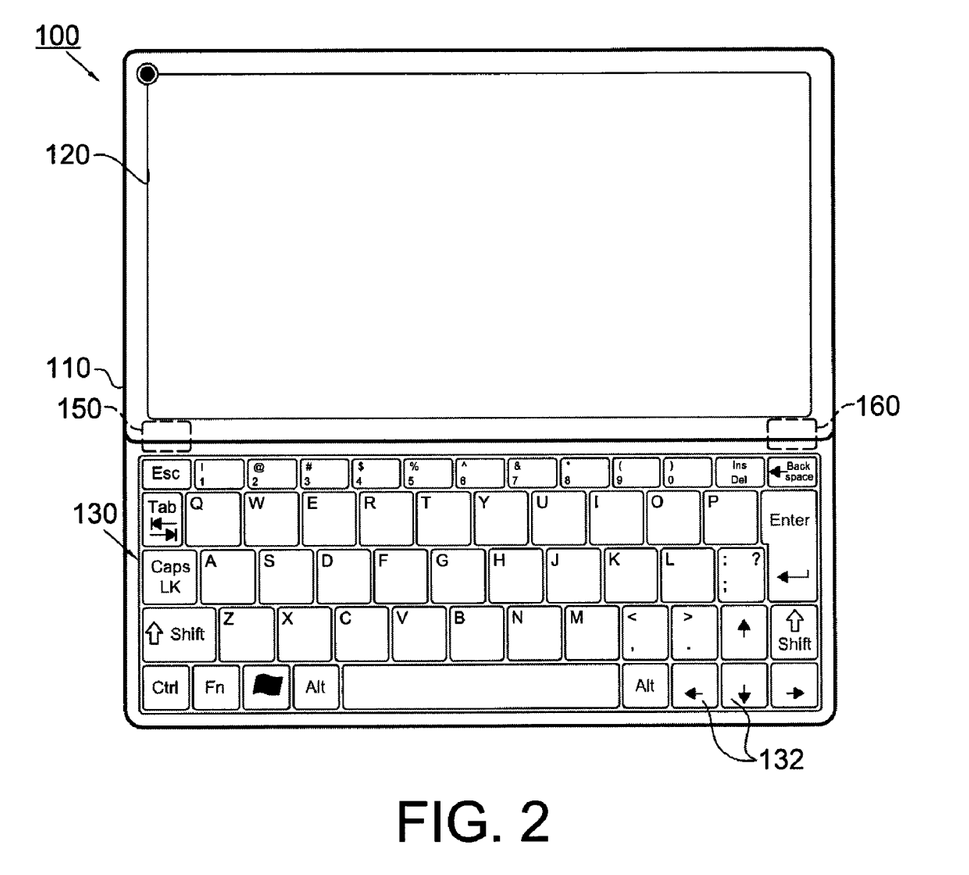
FIG. 2 illustrates the electronic device according to the present invention.
Figure 3:
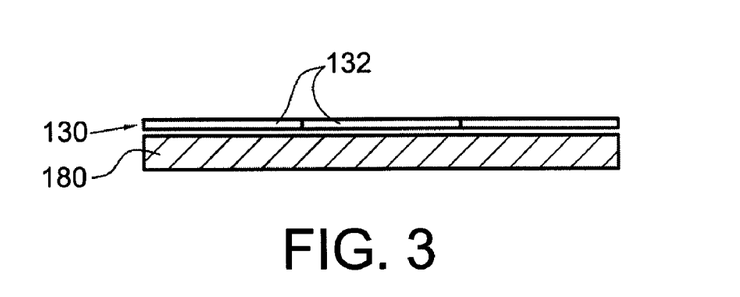
FIG. 3 is a cross-sectional view of the electronic device according to the present invention.

Referring to FIGS. 2 and 3, the electronic device 100 of the present invention includes a housing 110, a display 120 disposed on the housing 110, a keyboard unit 130 and a touch sensing element 180. The touch sensing element 180 is disposed under the keyboard unit 130 and the keyboard unit 130 includes a plurality of keys 132 labeled with letters, numbers or symbols. In this embodiment, the keys 132 are integrally formed on a same continuous surface. The keyboard unit 130 is a QWERTY keyboard. That is to say, the arrangement of the keys 132 labeled with English letters is referred to that of the English letter keys on a standard QWERTY keyboard. When a certain key 132 is touched, the touch sensing element 180 below will be activated to send a responsive signal corresponding to the touched key 132. According to the embodiment of the present invention, when a different key 132 is touched, a different responsive signal is sent by the touch sensing element 180.

According to the embodiment of the present invention, the operation of the keyboard unit 130 can be switched between two modes, wherein one mode is a touch operation mode and the other mode is a symbol input mode. When the keyboard unit 130 is operated in the symbol input mode, the keys 132 on the keyboard unit 130 are adapted to input symbols labeled thereon. When the keyboard unit 130 is operated in the touch operation mode, the keyboard unit 130 can be divided into a plurality of sensing areas and will be illustrated in the following detailed description.

Figure 4:
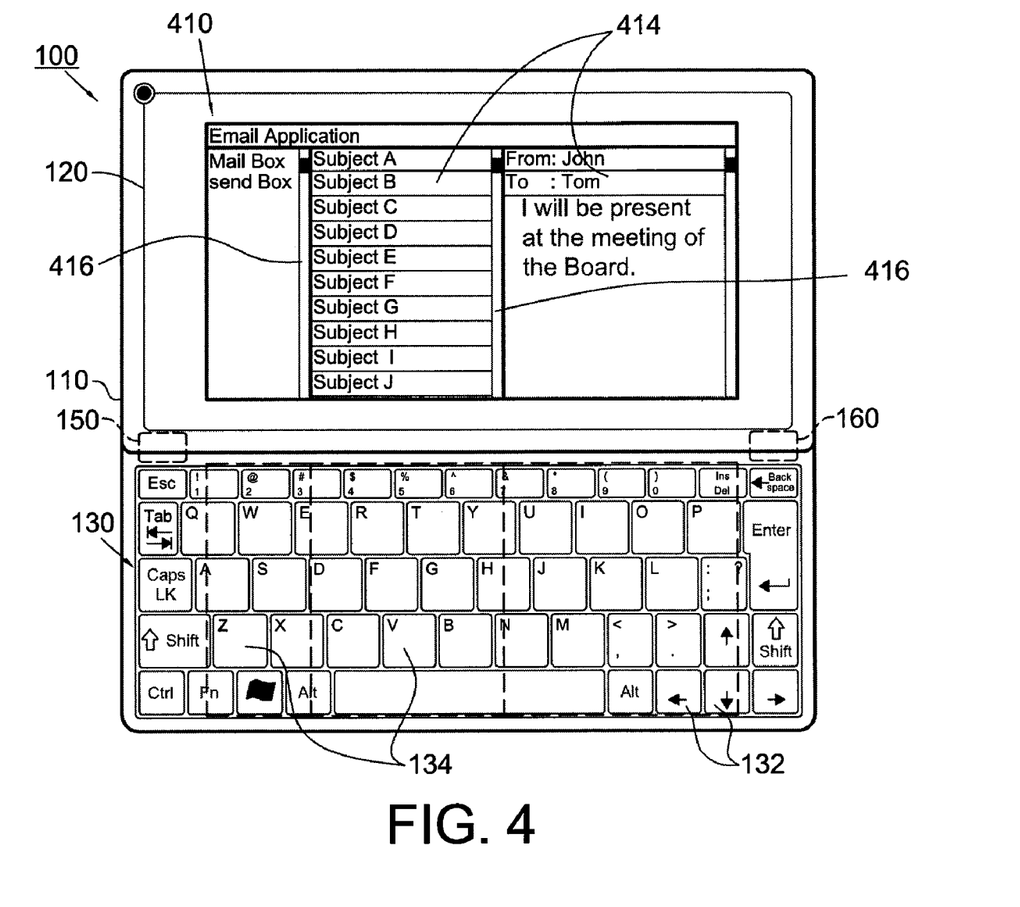
FIG. 4 illustrates the method for operating application programs in the electronic device according to the present invention, wherein the keyboard unit is divided into at least two sensing areas corresponding to the operation areas of the user interface of the application program.

Referring to FIG. 4, an application program is launched and executed by a processor 150 inside the housing 110. The application program has a user interface 410 shown on the display 120. The user interface 410 of the application program includes at least two operation areas 414 capable of showing information and a border area 416 positioned between two adjacent operation areas 414. Moreover, some related information provided by the application program, such as the border information of the border area 416 is acquired through another application program or the code stored in a firmware (not shown in the figure) and transmitted to a driving unit 160 of the keyboard unit 130 inside the housing 110. Alternatively, the driving unit 160 can directly acquire the border information of the border area 416 of the user interface 410 without the need of using any other application programs to transmit the related information. Afterward, according to the border information, the driving unit 160 divides the keyboard unit 130 into at least two sensing areas 134 corresponding to the at least two operation areas 414 of the user interface 410. It is to be noted that the driving unit 160 of the keyboard unit 130 according to the present invention can be a physical driving unit, a driving program formed by program codes with a function to drive the keyboard, or a combination thereof.

Figure 5A:
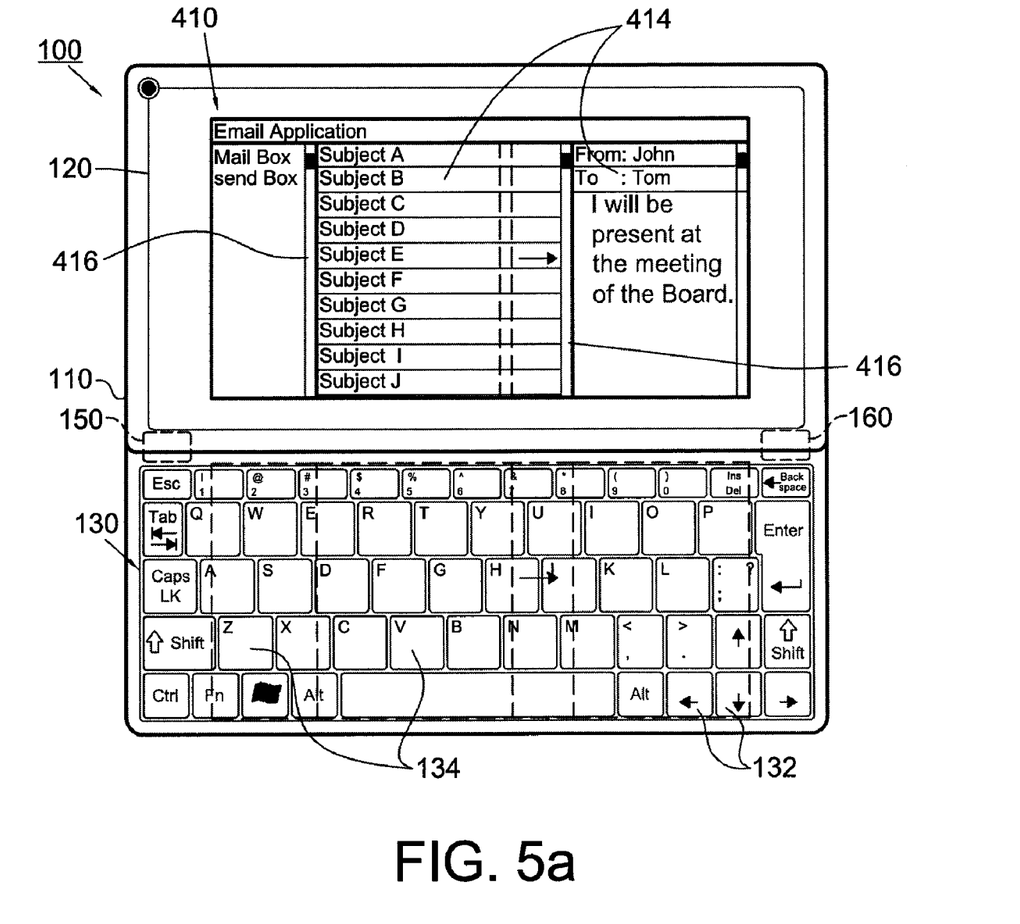
FIGS. 5a and 5b illustrate the method for operating application programs in the electronic device according to the present invention, wherein the sensing ranges of the sensing areas of the keyboard unit change with the change of the border area of the user interface.
Figure 5B:
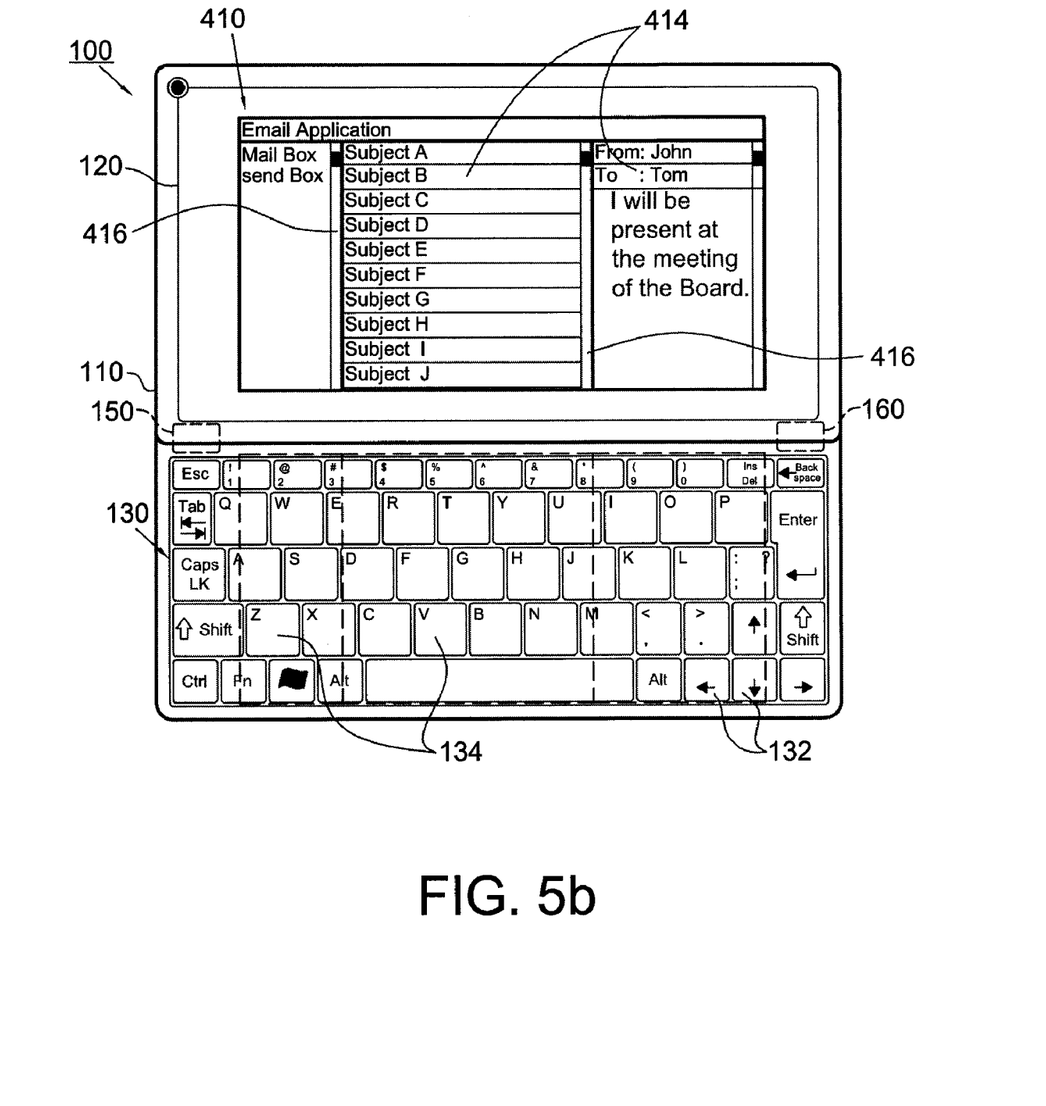

Referring to FIGS. 5a and 5b, when a user uses a mouse to drag the border area 416 along the arrow to change the position of the border area 416 of the user interface 410, the renewed border information of the border area 416 will be re-transmitted to the driving unit 160 and then the driving unit 160 changes the sensing ranges of the sensing areas 134 accordingly. In brief, the sensing ranges of the sensing areas 134 will make a dynamic change with the change of the border area 416 of the user interface 410.

When a user intends to operate the application program via the keyboard unit 130, the user can use a finger or a stylus to touch one of the sensing areas 134. The touch sensing element 180 detects the touch and sends a responsive signal according to the touch. The processor 150 then receives the responsive signal, and performs an action on the operation area 414 corresponding to the touched sensing area 134 according to the responsive signal. Similarly, when the user uses his finger to touch another of the sensing areas 134, the touch sensing element 180 will detect the touch and also send another responsive signal according to the touch. The processor 150 then receives the responsive signal, and performs another action on the operation area 414 corresponding to the touched sensing area 134 according to the responsive signal.

Figure 6:
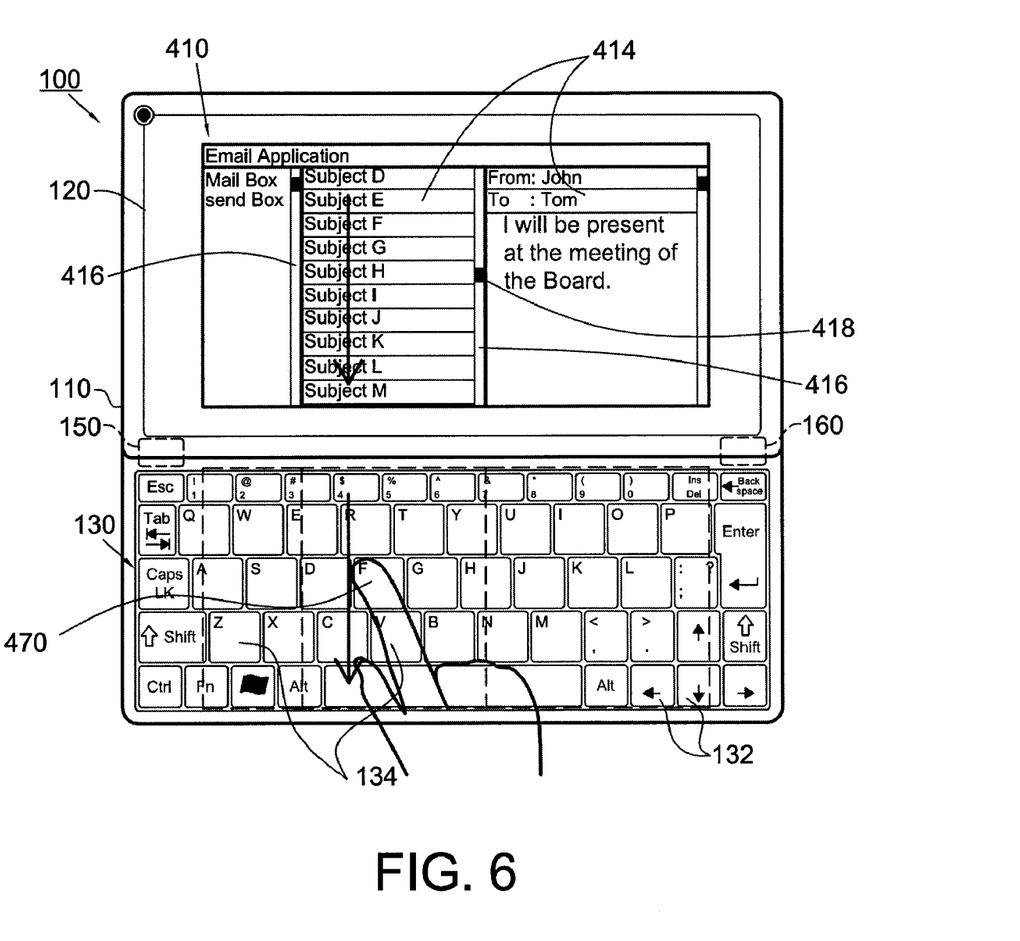
FIG. 6 illustrates the method for operating application programs in the electronic device according to the present invention, wherein the screen shown on the operation area of the user interface is scrolled with the movement of the user's finger over the sensing area of the keyboard unit.

For example, referring to FIG. 6, when a user intends to completely browse all information shown on a certain operation area 414 of the user interface 410, the user can use his finger 470 to touch the sensing area 134 corresponding to the certain operation area 414 and move the finger over the sensing area 134 for a specific distance. In this way, the screen shown on the operation area 414 will move in a direction opposite to the movement of the finger so that other hidden information can be shown on the operation area 414. For instance, when a user intends to completely browse all information shown on the middle operation area 414 of the user interface 410, the user can move his finger 470 downward over the middle sensing area 134. This action is equivalent to moving the vertical scrollbar 418 of the middle operation area 414 downward by using a mouse so as to scroll up the screen shown in the middle operation area 414. Similarly, when a certain operation area 414 has a horizontal scrollbar (not shown in the figure), a user can move his finger rightward over the corresponding sensing area 134 to scroll left the screen shown on the operation area 414.

Figure 7A:
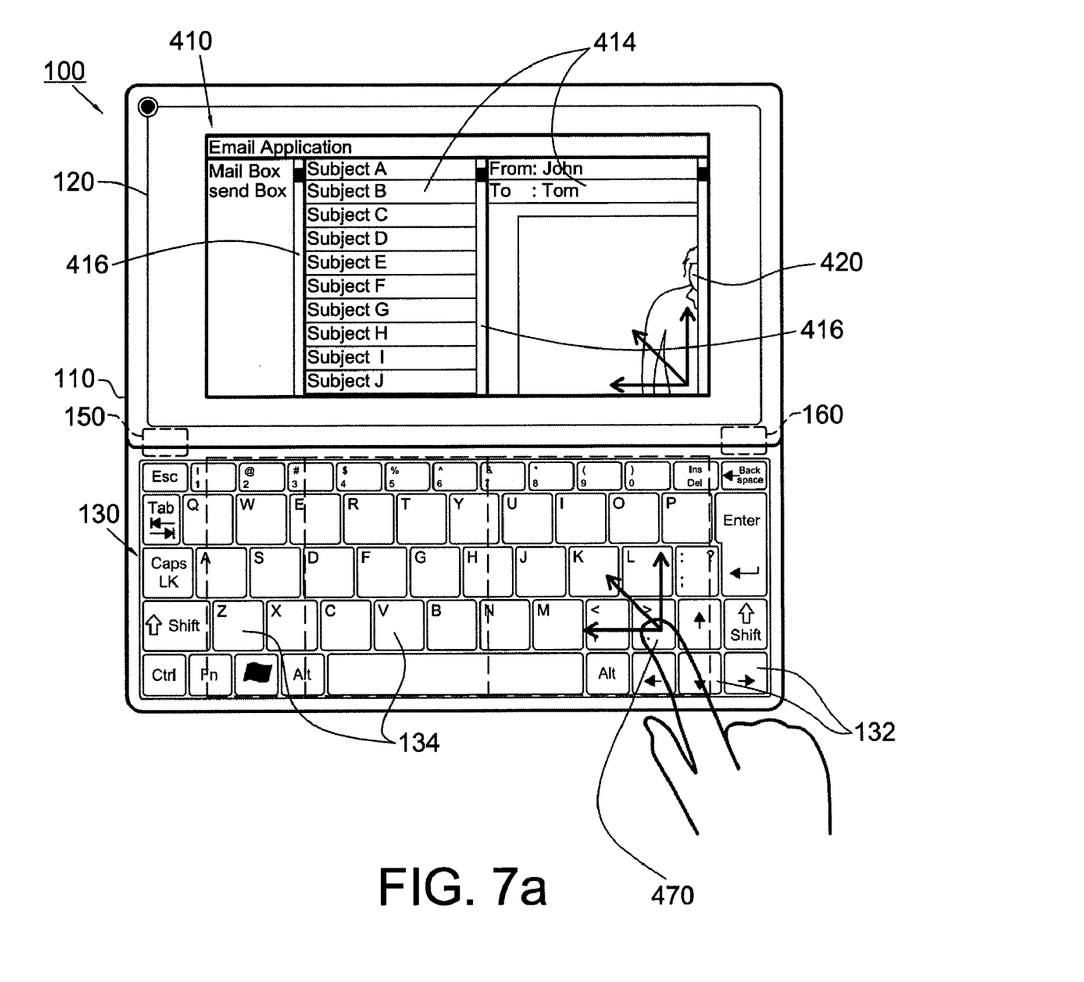
FIGS. 7a and 7b illustrate the method for operating application programs in the electronic device according to the present invention, wherein the image shown on the operation area of the user interface is panned with the movement of the user's finger over the sensing area of the keyboard unit.
Figure 7B:
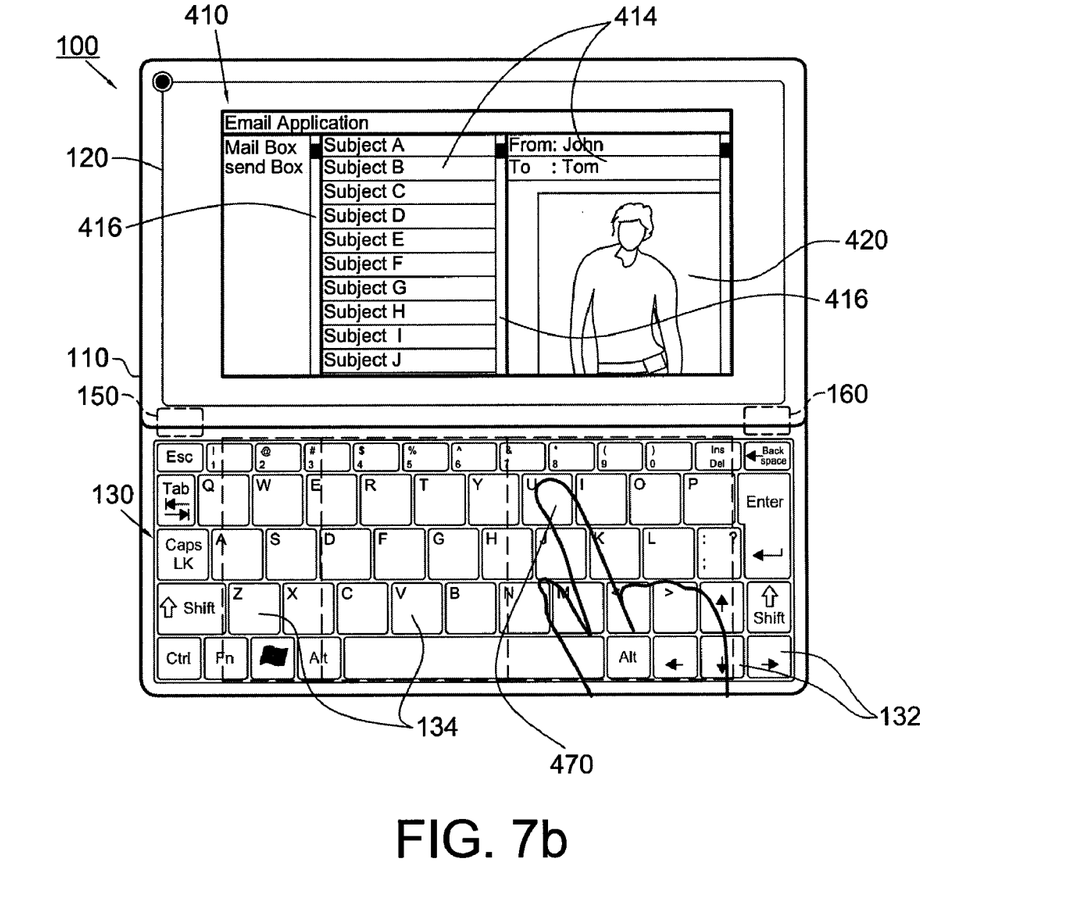

In addition, referring to FIGS. 7a and 7b, when the screen of a certain operation area 414 includes the information of an image 420 and the image 420 is too large to be fully shown on the operation area 414, the user can use his finger 470 to touch the sensing area 134 corresponding to the certain operation area 414 so as to move the finger over the sensing area 134 for a specific distance. In this way, the screen shown on the operation area 414 will move in a direction corresponding to the movement of the finger so that the hidden part of the image 420 can be shown on the operation area 414. The above action is equivalent to dragging the image 420 with a mouse so as to move the image 420 on the operation area 414.

Figure 8:
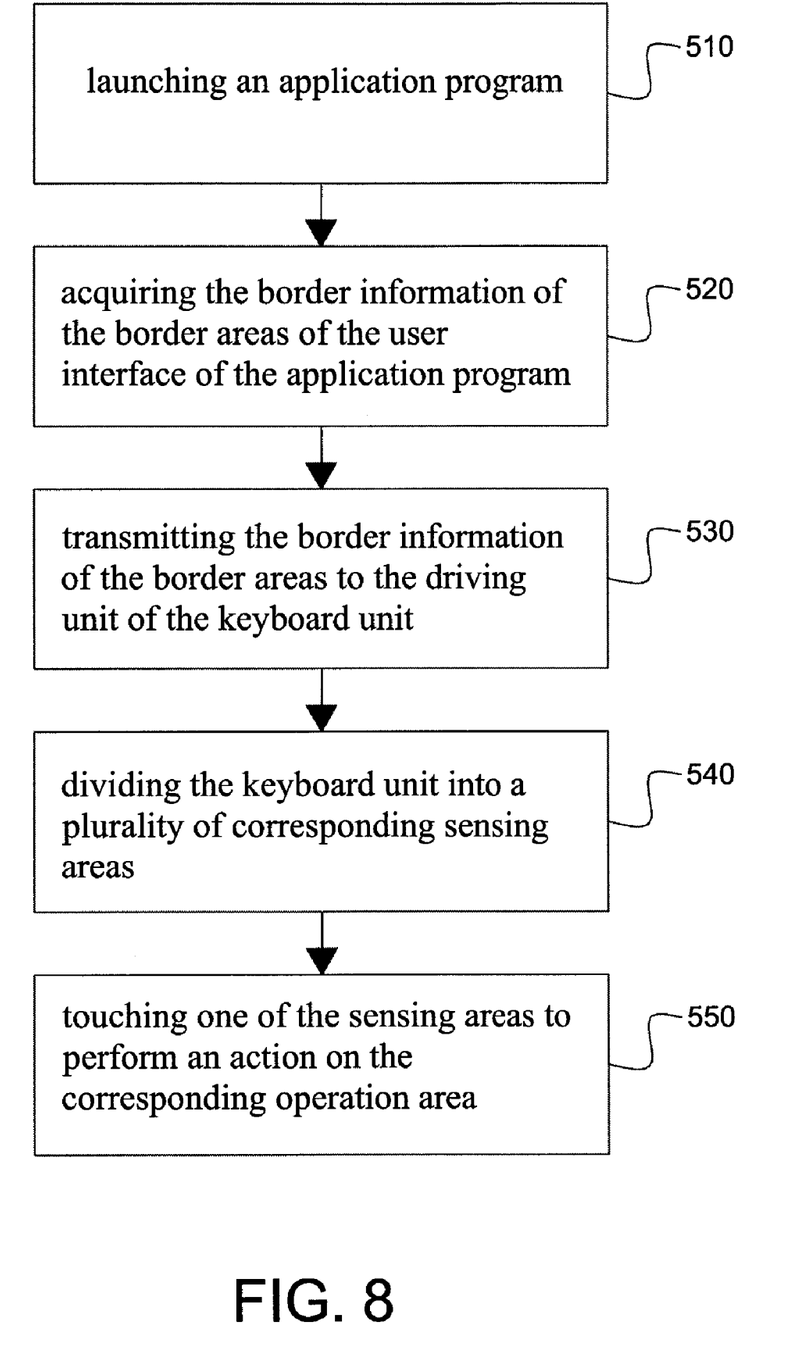
FIG. 8 is a flow chart illustrating the method for operating application programs in the electronic device according to the present invention.

Referring to FIG. 8, it is a flow chart illustrating the method for operating application programs in an electronic device according to the present invention. First, an application program is launched (step 510). Afterward, the border information of the border areas of the user interface of the application program is acquired by another application program or the code stored in a firmware (step 520). Next, the border information is transmitted to the driving unit of a keyboard unit (step 530). Subsequently, according to the border information, the driving unit divides the keyboard unit into at least two sensing areas respectively corresponding to at least two operation areas of the user interface(step 540). Finally, a user touches one of the sensing areas of the keyboard unit with his finger to perform a corresponding action on the operation area of the user interface corresponding to the touched sensing area (step 550).

According to the method for operating application programs in an electronic device, a user is not required to use a pointing device to move the cursor on a display back and forth between the operation areas in order to completely browse all the information shown thereon. All the information can be browsed by just moving the user's finger over the keyboard unit.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an application program in an electronic device having a keyboard unit, a touch sensing element, and a display, wherein the touch sensing element is disposed under the keyboard unit, the method comprising:
showing a user interface by the display, the user interface having a first operation area, a second operation area, and a border area positioned between the first and second operation areas;
acquiring a border information corresponding to the border area;
dividing the keyboard unit into a first sensing area and a second sensing area according to the border information, wherein the first and second sensing areas are corresponding to the first and second operation areas, respectively;
detecting a first touch on the first sensing area of the keyboard unit by the touch sensing element and generating a first responsive signal according to the first touch; and
performing a first action on the first operation area according to the first responsive signal.

2. The method as claimed in claim 1, further comprising:
switching the operation mode of the keyboard unit to a symbol input mode for inputting symbols.

3. The method as claimed in claim 1, further comprising:
detecting a second touch on the second sensing area of the keyboard unit by the touch sensing element and generating a second responsive signal according to the second touch; and
performing a second action on the second operation area according to the second responsive signal.

4. The method as claimed in claim 1, further comprising:
moving the position of the border area of the user interface; and changing the sensing ranges of the first and second sensing areas according to the renewed position of the border area.

5. The method as claimed in claim 1, further comprising:
when the first touch is detected and moved over the first sensing area for a specific distance, performing a scrolling action on the first operation area.

6. The method as claimed in claim 1, further comprising:
when the first touch is detected and moved over the first sensing area for a specific distance, performing a drag action on the first operation area.

7. An electronic device for achieving the method of claim 1.

8. An electronic device, comprising:
a display adapted to show a user interface of an application program, the user interface having a first operation area and a second operation area;
a keyboard unit adapted to be operated in a touch operation mode, wherein when the keyboard unit is operated in the touch operation mode, the keyboard unit has a first sensing area and a second sensing area defined thereon which are corresponding to the first and second operation areas, respectively;
a touch sensing element disposed under the keyboard unit, adapted to detect a first touch on the first sensing area and generate a first responsive signal according to the first touch, and to detect a second touch on the second sensing area and generate a second responsive signal according to the second touch; and
a processor adapted to perform a first action on the first operation area according to the first responsive signal, and to perform a second action on the second operation area according to the second responsive signal.

9. The electronic device as claimed in claim 8, wherein the keyboard unit is further adapted to be operated in a symbol input mode for inputting symbols.

10. The electronic device as claimed in claim 8, wherein the user interface further has a border area positioned between the first and second operation areas, the electronic device further comprises:
a driving unit adapted to divide the keyboard unit into the first and second sensing areas according to a border information corresponding to the border area.

11. The electronic device as claimed in claim 8, wherein the first action is a scrolling action.

12. The electronic device as claimed in claim 8, wherein the first action is a drag action.

* * * * *